(12) United States Patent
Allison et al.

(10) Patent No.: US 12,472,562 B2
(45) Date of Patent: Nov. 18, 2025

(54) FRICTION BASED ADDITIVE MANUFACTURING SYSTEMS AND METHODS

(71) Applicant: The Board of Trustees of the University of Alabama, Tuscaloosa, AL (US)

(72) Inventors: Paul Galon Allison, Northport, AL (US); James Brian Jordon, Tuscaloosa, AL (US)

(73) Assignee: The Board of Trustees of the University of Alabama, Tuscaloosa, AL (US)

( * ) Notice: Subject to any disclaimer, the term of this patent is extended or adjusted under 35 U.S.C. 154(b) by 172 days.

(21) Appl. No.: 18/048,758

(22) Filed: Oct. 21, 2022

(65) Prior Publication Data

US 2023/0146110 A1    May 11, 2023

Related U.S. Application Data

(60) Provisional application No. 63/270,470, filed on Oct. 21, 2021.

(51) Int. Cl.
*B33Y 30/00* (2015.01)
*B22F 10/22* (2021.01)
(Continued)

(52) U.S. Cl.
CPC .............. *B22F 12/55* (2021.01); *B22F 10/22* (2021.01); *B23K 20/1215* (2013.01); *B33Y 10/00* (2014.12); *B33Y 30/00* (2014.12)

(58) Field of Classification Search
None
See application file for complete search history.

(56) References Cited

U.S. PATENT DOCUMENTS

| 3,075,241 A | 1/1963 | Dietzsch et al. |
| 4,758,259 A | 7/1988 | Jensen |

(Continued)

FOREIGN PATENT DOCUMENTS

| CN | 110193658 B | * | 3/2021 | ......... B23K 20/1215 |
| CN | 112496522 A | * | 3/2021 | |

(Continued)

OTHER PUBLICATIONS

Anthony Ernest, "A deployable bottom fed conical log-spiral antenna for CubeSat applications", University of New Mexico Digital Repository, Engineering ETDs, Jul. 2, 2012, 118 pages.

(Continued)

*Primary Examiner* — Devang R Patel
(74) *Attorney, Agent, or Firm* — Meunier Carlin & Curfman LLC (57) ABSTRACT

Various implementations of a system for friction based additive manufacturing include a tool head that includes a central axis, a first end, and a second end opposite and spaced apart from the first end along the central axis. The tool head defines a feed channel that extends between openings defined by the first end and the second end. The opening defined by the second end is offset from the central axis of the tool head. The tool head is configured for rotating about the central axis. The system also includes an actuator that is configured to urge a feed material through the feed channel in a direction from the first end to the second end. The second end of the tool head is configured for being disposed adjacent a substrate onto which the feed material is being friction stir deposited.

15 Claims, 11 Drawing Sheets

(51) Int. Cl.
  *B22F 12/55* (2021.01)
  *B23K 20/12* (2006.01)
  *B33Y 10/00* (2015.01)

(56) References Cited

U.S. PATENT DOCUMENTS

| | | | |
|---|---|---|---|
| 6,915,964 | B2 | 7/2005 | Tapphorn et al. |
| 8,397,974 | B2 | 3/2013 | Schultz et al. |
| 8,632,850 | B2* | 1/2014 | Schultz ................ C23C 26/00 |
| | | | 427/180 |
| 8,636,194 | B2 | 1/2014 | Schultz et al. |
| 8,672,241 | B2 | 3/2014 | Wurz |
| 8,875,976 | B2 | 11/2014 | Schultz et al. |
| 8,893,954 | B2 | 11/2014 | Schultz et al. |
| 9,205,578 | B2 | 12/2015 | Schultz et al. |
| 9,266,191 | B2 | 2/2016 | Kandasamy et al. |
| 9,511,445 | B2 | 12/2016 | Kandasamy |
| 9,511,446 | B2 | 12/2016 | Kandasamy et al. |
| 9,643,279 | B2 | 5/2017 | Schultz et al. |
| 9,862,054 | B2 | 1/2018 | Kandasamy et al. |
| 11,217,213 | B2* | 1/2022 | Greene ................ G10D 3/02 |
| 2012/0009339 | A1* | 1/2012 | Creehan ............. B23K 20/1245 |
| | | | 427/180 |
| 2012/0279441 | A1* | 11/2012 | Creehan ................ C23C 26/00 |
| | | | 228/2.1 |
| 2015/0165554 | A1* | 6/2015 | Voice ..................... B23K 26/34 |
| | | | 219/76.1 |
| 2018/0056446 | A1* | 3/2018 | Mezawa ................ B29C 67/00 |
| 2018/0369966 | A1* | 12/2018 | Hansen ................ B23K 26/348 |
| 2020/0306869 | A1* | 10/2020 | Hardwick .......... B23K 20/1215 |
| 2020/0331203 | A1* | 10/2020 | Verma .................. B23K 20/126 |
| 2021/0046579 | A1* | 2/2021 | Rodriguez ............. B33Y 30/00 |

FOREIGN PATENT DOCUMENTS

| | | | | |
|---|---|---|---|---|
| CN | 113172331 | A | * 7/2021 | ........... B23K 20/122 |
| EP | 3578365 | A1 | * 12/2019 | ........... B29C 64/106 |

OTHER PUBLICATIONS

Collino, Rachel R., et al., "Deposition of ordered two-phase materials using microfluidic print nozzles with acoustic focusing," Extreme Mechanics Letters, vol. 8, Sep. 2016, pp. 96-106.

Van Der Stelt AA, Bor TC, Geijselaers HJM, Akkerman R, van den Boogaard AH, "Cladding of advanced Al alloys employing friction stir welding". Key Engineering Materials, Jun. 13, 2013, vol. 554-557, pp. 1014-1021, Trans Tech Publications Ltd.

* cited by examiner

FRICTION BASED ADDITIVE MANUFACTURING SYSTEMS AND METHODS

CROSS-REFERENCE TO RELATED APPLICATIONS

This application claims benefit of U.S. Provisional Application 63/270,470, filed on Oct. 21, 2021, the content of which is hereby incorporated in its entirety.

BACKGROUND

Solid-phase thermo-mechanical processes are used for additive manufacturing and repair. Additive friction stir deposition allows for dense material deposition, refined and equiaxed grains, and minimal distortion of the substrate. However, current additive friction stir deposition methods and other solid-phase additive manufacturing methods have limited capabilities. Depositing large deposits requires reloading of feed rods and constant attention from a user during the deposition process. In addition, known tools for additive friction stir deposition require non-circular feed rods to avoid rotational slipping of the feed rod with respect to the tool.

Thus, a need exists for improved systems for solid-phase additive manufacturing and/or additive friction stir deposition.

BRIEF DESCRIPTION OF DRAWINGS

Example features and implementations are disclosed in the accompanying drawings. However, the present disclosure is not limited to the precise arrangements and instrumentalities shown.

DETAILED DESCRIPTION

The devices, systems, and methods described herein include a system for high shear continuous solid-phase deposition of material without solid-liquid-solid phase transformations.

According to various implementations, the system includes a tool defining a feed channel that allows for the continuous deposit of feed material while preventing melting when cladding, repairing, or depositing the feed material (e.g., in one or more layers) onto a substrate. The feed material (e.g., feed rod or feed wire) is rotated by a tool head of the tool about a central axis of the tool head adjacent the substrate. The outlet opening of the feed channel is offset from the central axis of the tool head, which allows for the use of circular feed rods or feed wires. The tool head includes one or more channels. The tool head may define more channels to increase deposition rate and reduce localized stresses in the tool, or the tool may define fewer channels to increase resolution and decrease the size of the deposition, according to some implementations. In addition, having the outlet opening of the feed channel(s) be offset from the central axis of the tool head eliminates the need for co-dependent rotation of the feed rod or feed wire and the tool head. In other words, the feed rod or feed wire can rotate about its own axis (or not) independently of the rotation of the tool head about its central axis.

According to various implementations, a system for friction based additive manufacturing is disclosed herein. The system includes a tool head and an actuator. The tool head includes a central axis, a first end, and a second end opposite and spaced apart from the first end along the central axis. The tool head defines a feed channel that extends between openings defined by the first end and the second end. The opening defined by the second end is offset from the central axis. The tool head is configured to rotate about the central axis. The actuator is configured to urge a feed material through the feed channel in a direction from the first end to the second end of the tool. The actuator is disposed adjacent the first end of the tool, and a second end of the tool is configured for being disposed adjacent a substrate onto which the feed material is being friction stir deposited.

In some implementations, the actuator engages an external perimetrical surface of the feed material to urge the feed material toward the substrate. Engaging the external perimetrical surface allows for more uniform processing and controlled conditions in depositing the feed material onto the substrate. As used herein, perimetrical surface refers to the external surface of the feed material as viewed through a radial cross-section of the feed material, regardless of the radial cross-sectional shape of the feed material. For example, for a feed material having a circular radial cross-sectional shape, the external perimetrical surface refers to the external circumferential surface of the feed material.

In some implementations, the force of the actuator on the feed material is controlled (e.g., by controlling the speed of rotation of the actuator and/or by controlling a downward force on the actuator) to control the feed rate of the feed material through the tool head and onto the substrate and to control a height of the layer of feed material being deposited.

According to various implementations, a method of friction based additive manufacturing is disclosed herein. The method includes (1) providing a tool including a central axis, a first end, and a second end opposite and spaced apart from the first end along the central axis, the tool defining a feed channel that extends between openings defined by the first end and the second end, the opening defined by the second end being offset from the central axis, and wherein the tool further comprises an actuator that is disposed adjacent the first end of the tool; (2) disposing a portion of a feed material through the feed channel; (3) actuating the actuator such that the actuator urges the feed material through the feed channel in a direction from the first end to the second end of the tool; and (4) rotating the tool about the central axis and moving the tool through a plane that is parallel to a substrate onto which the feed material is being friction stir deposited by the tool.

Figure 1:
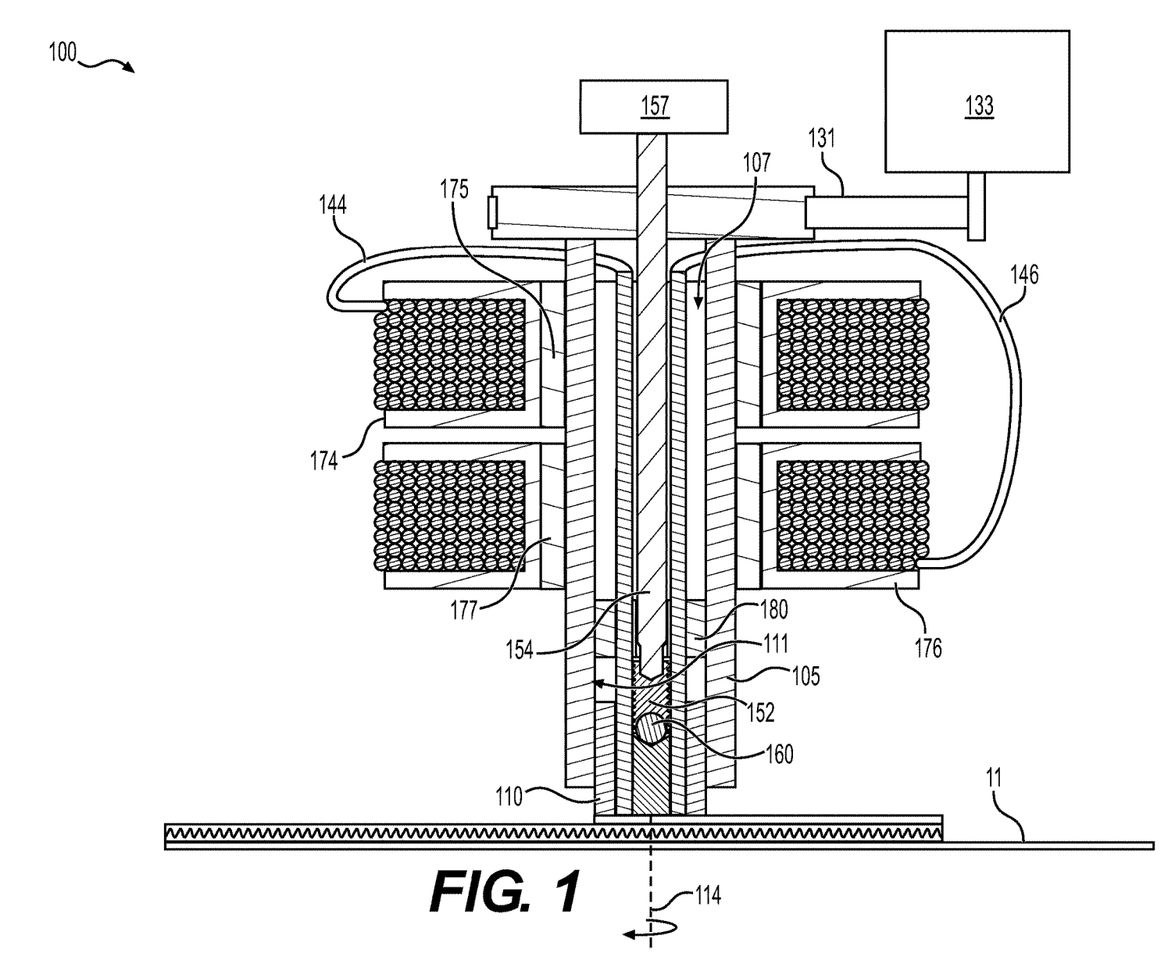
FIG. 1 is a cross-sectional view of a system for friction based additive manufacturing.

FIG. 1 shows an implementation of a system 100 for friction based additive manufacturing that includes a tool 105 comprising a tool head 110 and a spacer 180, an actuator 150, and two spools 174, 176 of feed material 144, 146, according to one implementation of the aspects described herein. For example, the system 100 is an additive friction stir deposition system. As used herein, the term feed material includes, but is not limited to, feed rods or feed wires.

Figure 2:
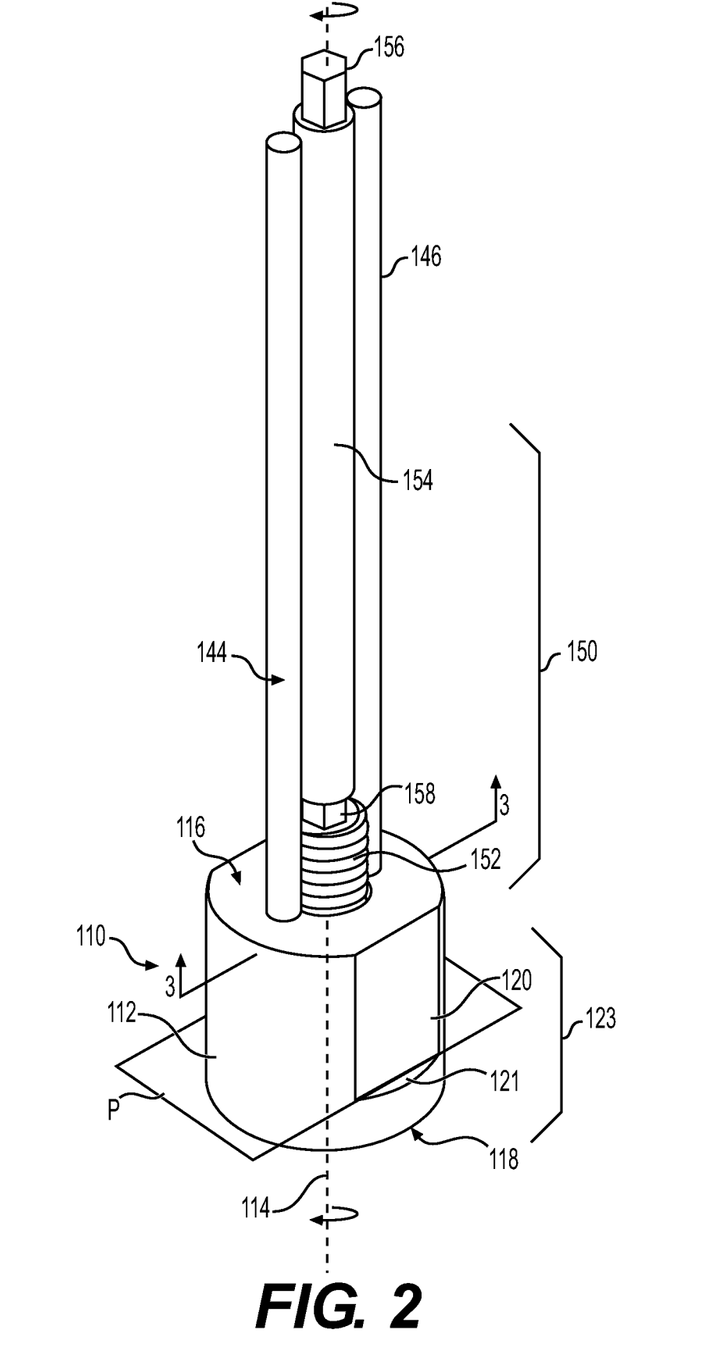
FIG. 2 is a partial, detailed perspective view of a tool head, an actuator, and feed materials of the system of FIG. 1.

As shown in FIGS. 1 and 2, the tool head 110 includes a cylindrically shaped outer wall 112, a central axis 114, a first end 116, and a second end 118 opposite and spaced apart from the first end 116 along the central axis 114. The outer wall 112 extends between the first end 116 and the second end 118. The outer wall 112 of the tool head 110 includes a tool engagement portion 123 that extends axially from the first end 116 to a plane P that extends orthogonal to the central axis 114 between the first end 116 and the second end 118. The tool engagement portion 123 defines two flat portions 120 that each extend axially from the first end 116 to the plane P and two shoulders 121 that extend transversely from the flat portions 120 to the outer wall 112 in plane P. The flat portions 120 are diametrically opposed and lie in planes parallel to each other. A cross-sectional shape of the tool engagement portion 123 as viewed in plane P (or a plane extending through the tool engagement portion that is parallel to plane P) corresponds to the cross-sectional shape of an inner wall 111 of a cavity 107 of a tool 105 as viewed in a plane that is perpendicular to a central axis of the tool 105. In particular, the cross-sectional shape of the inner wall 111 of the tool 105 has two arcuate shaped wall portions and two flat wall portions that correspond to the cross-sectional shape of the tool head 110 as viewed in plane P described above. The ends of the arcuate shaped wall portions of the inner wall 111 extend between the ends of the two flat wall portions of the inner wall 111 such that the arcuate shaped wall portions are diametrically opposed, and the flat wall portions are diametrically opposed.

The tool engagement portion 123 is configured for engaging the inner wall of the cavity 107 of the tool 105 via a friction fit and not rotating relative to the tool 105 when the tool 105 is rotated about the central axis 114 of the tool head 110. Set screws may be inserted radially through the tool to engage the tool head to prevent the tool head from being unintentionally removed relative to the tool. The tool head 110 is removable from the tool 105 such that another tool head can replace it when the tool head 110 is damaged or has deposits on it that compromise its effectiveness (e.g., to mitigate cross-contamination between different deposited materials).

Figure 14:
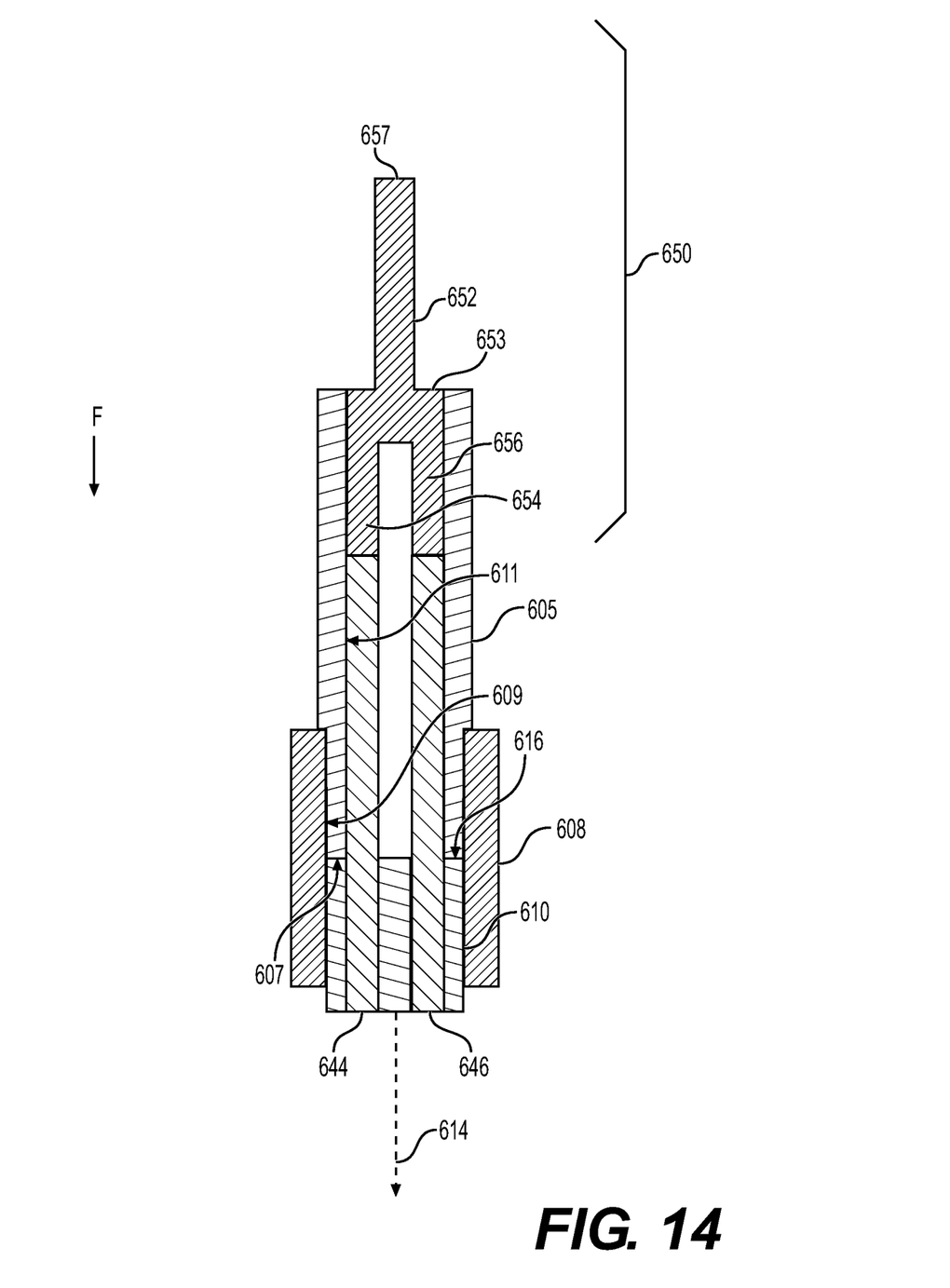
FIG. 14 is a cross-sectional view of a tool, tool head, coupling collar, and actuator according to another implementation.
Figure 15:
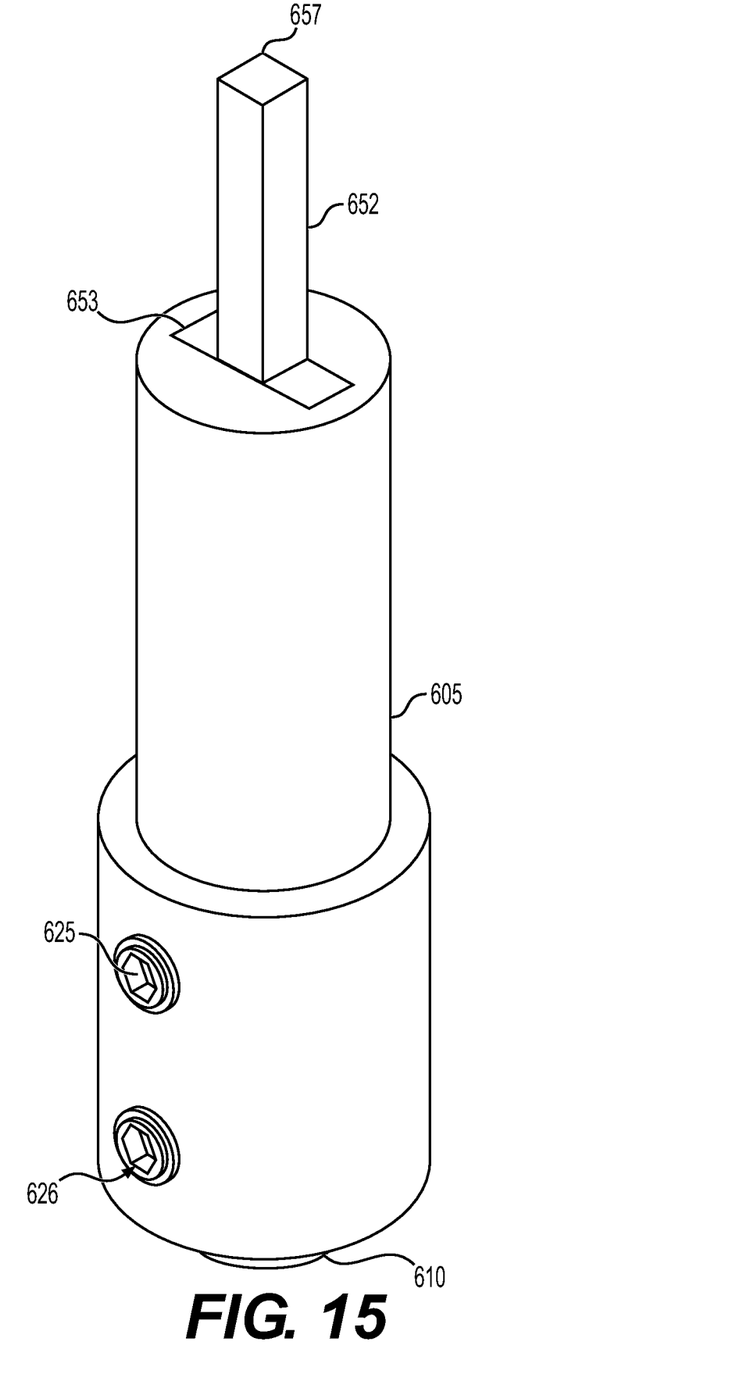
FIG. 15 is a perspective view of the tool, tool head, coupling collar, and actuator shown in FIG. 14.
Figure 16:
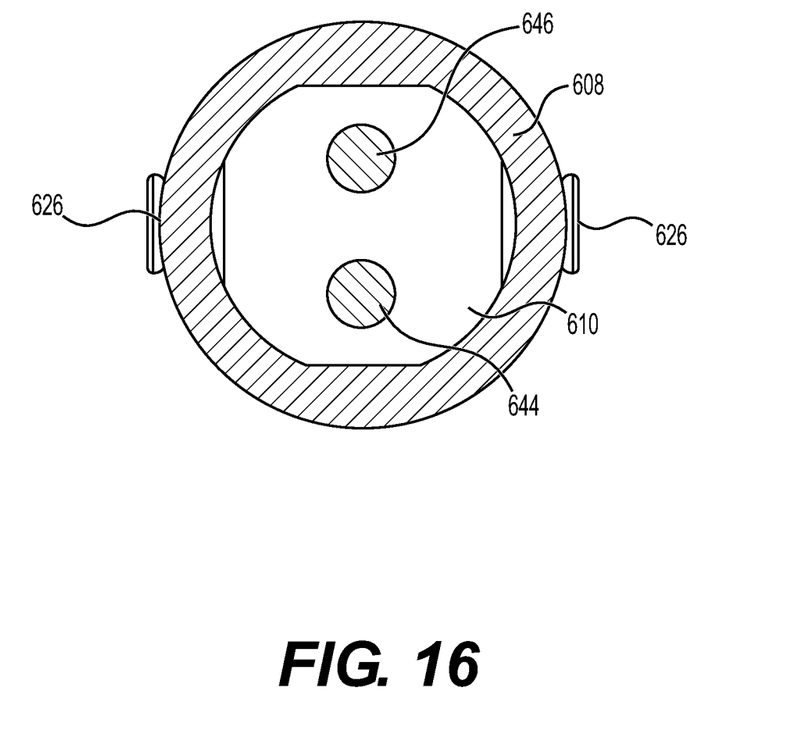
FIG. 16 is an end view of the tool head and coupling collar shown in FIG. 14.

In other implementations, the tool head and the tool may be coupled by other suitable mechanisms such that movement of the tool head relative to the tool is prevented and rotation of the tool is translated to the tool head. For example, FIG. 14-16 illustrate an example implementation of a coupling collar 608 that couples the tool 605 and the tool head 610. In this implementation, a portion of the tool head 610 does not engage within a cavity of the tool 605. A first surface 616 of the tool head 610 is axially abutted against a second surface 607 of the tool 605 that faces the first surface 616 of the tool head 610. An inner wall 609 of the coupling collar 608 slides over and engages at least a portion of the external surfaces of the tool head 610 and the tool 605 that face the inner wall 609 such that the coupling collar 608 surrounds the abutting surfaces of the tool head 610 and tool 605. At least one set screw 625 is engaged radially through the coupling collar 608 to abut the tool 605, and at least one set screw 626 is engaged radially through the coupling collar 608 to abut the tool head 610. As shown in FIGS. 15 and 16, diametrically opposed set screws 625, 626 are engaged through the coupling collar 608 to engage the tool 605 and the tool head 610, respectively. The set screws 625, 626 prevent movement of the tool 605 and tool head 610 relative to each other. In other implementations (not shown), screws that extend through at least a portion of the tool and/or tool head, bolts, or other suitable fasteners may be used instead of set screws to couple the tool and the tool head to each other and/or to the coupling collar.

The tool head material selected has a hardness that is greater than the hardness of the feed material to be deposited. For example, to deposit lightweight alloys, like aluminum or magnesium alloys, a harder tool head material, such as tool steel, is appropriate. Whereas, for steels, nickel-based alloys, high entropy alloys, or titanium alloys, a harder tool head material, such as tungsten-rhenium or tungsten-lanthanide, helps to extend tool life, minimizing wear of the tool material being deposited with the feed material that is fed through the tool head.

The tool head 110 defines a first feed channel 122 and a second feed channel 132. Each channel 122, 132 extends along a channel axis that is offset from the central axis 114. The first end 116 of the tool head 110 defines a first feed channel inlet 124 to the first feed channel 122 and a second feed channel inlet 134 to the second feed channel 132. The first end 116 of the tool head 110 also defines an actuator recess 138 disposed between the first feed channel inlet 124 and the second feed channel inlet 134 and coaxial with the central axis 114. The second end 118 of the tool head 110, which is shown in detail in FIG. 2, defines a first feed channel outlet 126 to the first feed channel 122 and a second feed channel outlet 136 to the second feed channel 132. The first feed channel 122 and the second feed channel 132 extend along axes that are parallel to the central axis 114. The first feed channel 122 and the second feed channel 132 are diametrically opposed to each other.

Although the implementation shown in FIGS. 1 and 2 defines two feed channels 122, 132, in other implementations, the tool head defines one or more feed channels, wherein the opening defined by the second end is offset from the central axis. And, although the implementation in FIGS. 1 and 2 shows the channel axes of the feed channels equally spaced from each other about the central axis of the tool head, in other implementations, the channel axes of the feed channels are unequally spaced from each other about the central axis of the tool head. For example, in the implementation shown in FIG. 8, the tool head 210 defines three feed channels 222, 232, 242 having channel axes that are equally spaced about the central axis 214 of the tool head 210.

Figure 8:
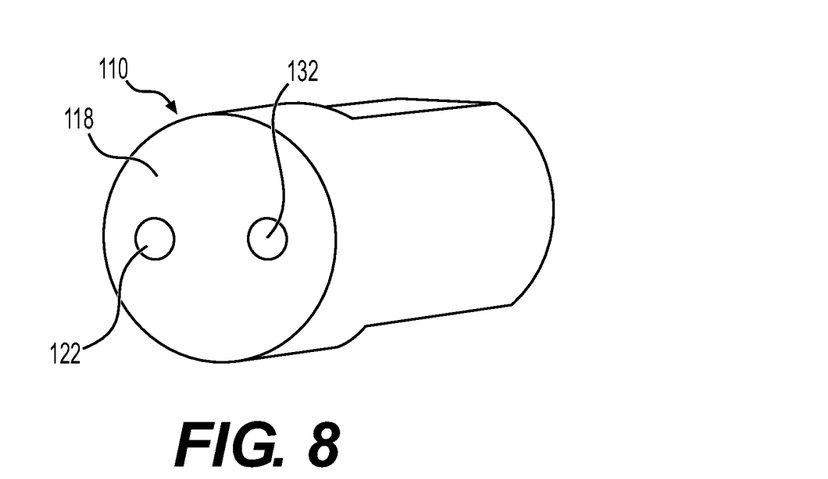
FIG. 8 is an end view of the tool head shown in FIG. 1.
Figure 9:
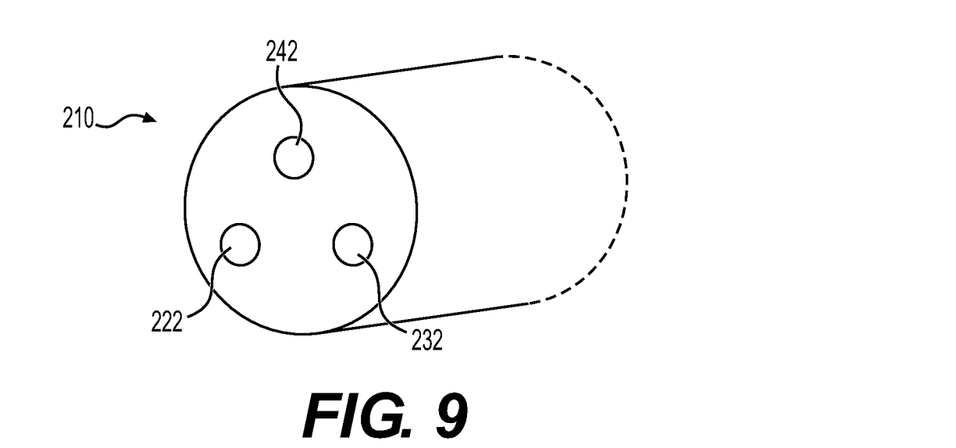
FIG. 9 is an end view of a tool head according to another implementation.
Figure 10:
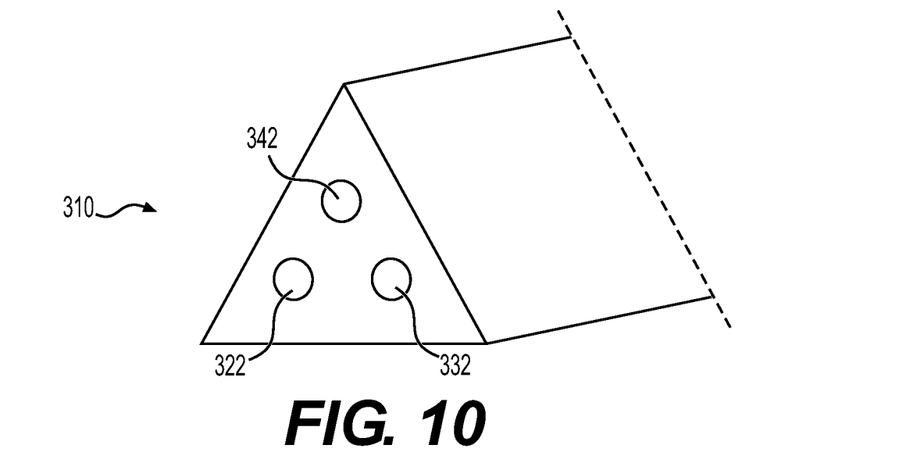
FIG. 10 is an end view of a tool head according to another implementation.

Although the implementation shown in FIGS. 1, 2, and 8 shows a cylindrically shaped tool head, the tool head may have any elongated solid shape (e.g., elliptical, prismatic, or any solid shape having straight and/or curved surfaces) that allows it to be used with the system. For example, in the implementation shown in FIG. 10, the tool head 310 is a triangular prism that defines three feed channels 322, 332, 342 that are equally spaced from each other about the central axis 314.

Although the implementations shown in FIGS. 1-2, 8, 9, and 10 show channels having a circular cross-sectional shape as viewed in a plane perpendicular to the central axis of the tool, in other implementations, the feed channels may have any suitable cross-sectional shape (e.g., elliptical, polygonal, or any closed shaped having straight and/or curved lines) as viewed in a plane perpendicular to the central axis of the tool head that corresponds to the cross-sectional shape of the feed material.

To operate the tool head 110, a first feed material 144 is disposed within the first feed channel 122 and a second feed material 146 is disposed within the second feed channel 132. Both the first feed material 144 and the second feed material 146 are fed through the tool head 110 such that the feed material enters the respective inlet and exits the respective outlet. Because the material is fed through the first end 116 of the tool head 110 and exits from the second end 118 of the tool head 110, a user is not required to continually stop and feed the feed material through the second end 118 of the tool head 110, as in known tools. In some implementations, the feed material is a spooled feed material, discrete rods, strips of material, or any suitable feed material for friction stir welding that can be continuously top fed into the tool.

In the implementation shown in FIG. 1, the cross-section of the feed material 144, 146 is circular, however, in other implementations, the cross-section of the feed material is polygonal or any other suitable closed shape. In FIG. 1, the first feed material 144 and the second feed materials 146 are the same, although, in other implementations, the first feed material and the second feed material are different. In some implementations, the feed materials include combinations of similar and dissimilar materials, such as aluminum and aluminum alloys, magnesium and magnesium alloys, steels, stainless steels, multi-principal element alloys or high entropy alloys, titanium and titanium alloys, copper and copper alloys, nickel based super alloys, and metal matrix composites.

Figure 3:
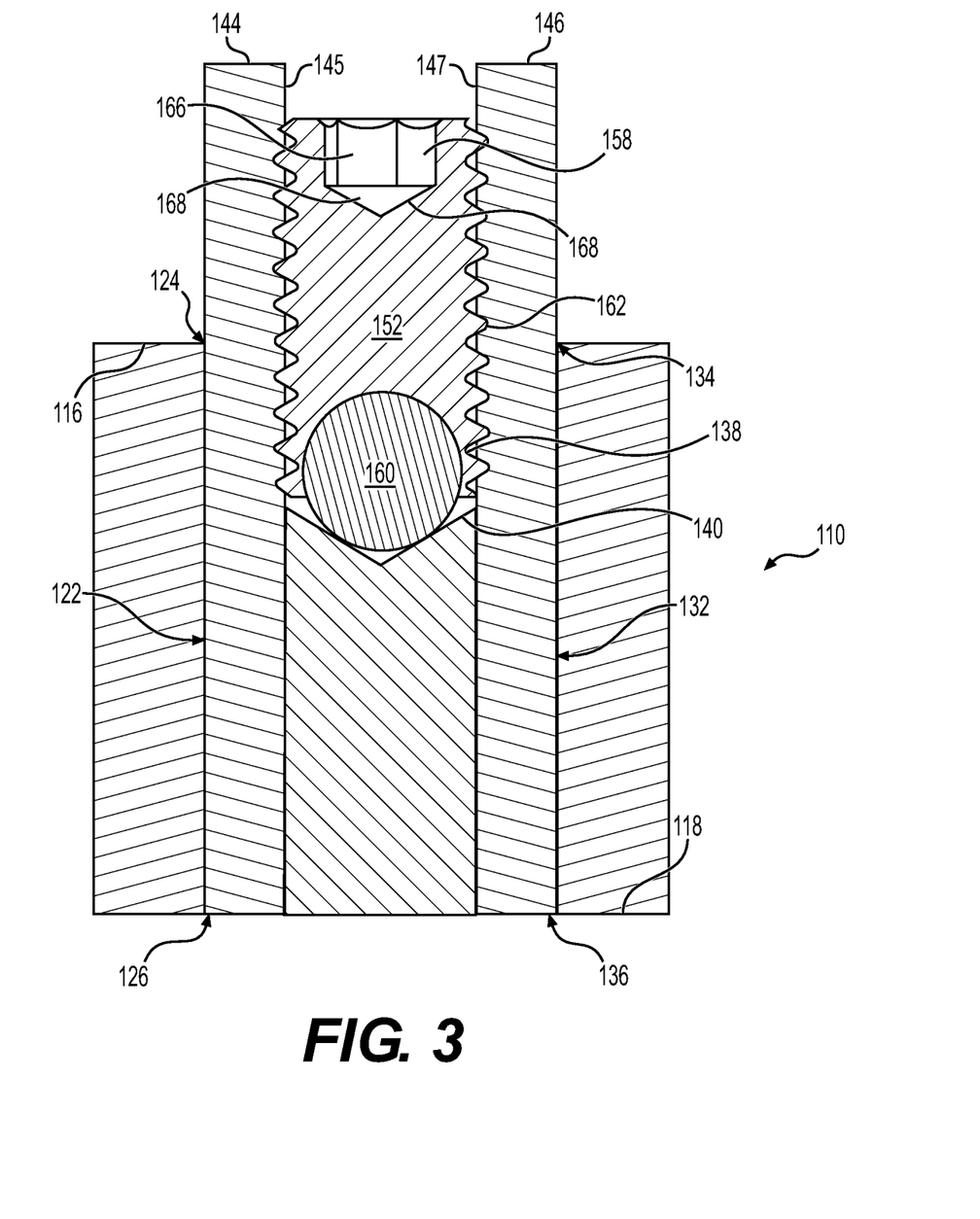
FIG. 3 is a partial, detailed cross-sectional view of the tool head, actuator, and feed materials shown in FIG. 2 as taken along the 3-3 line.
Figure 4:
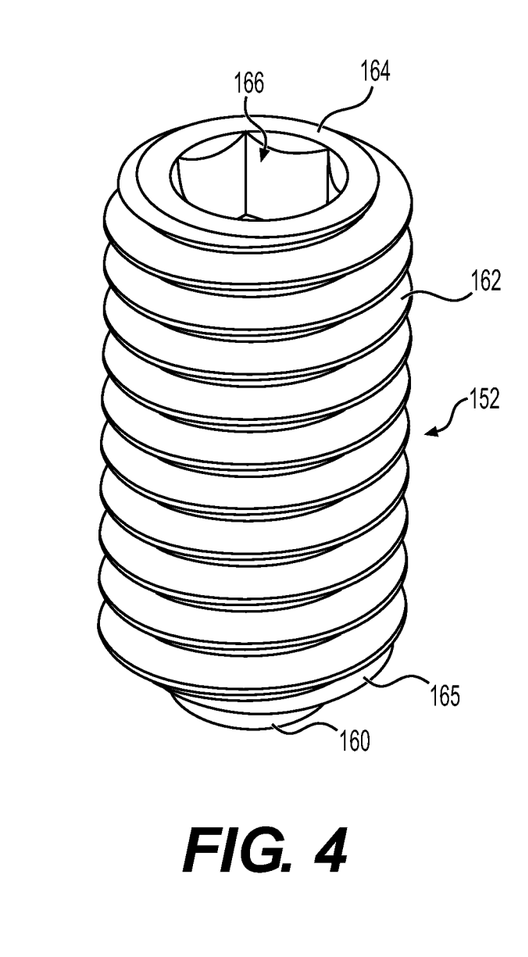
FIG. 4 is a detailed perspective view of the actuator shown in FIG. 1.
Figure 5:
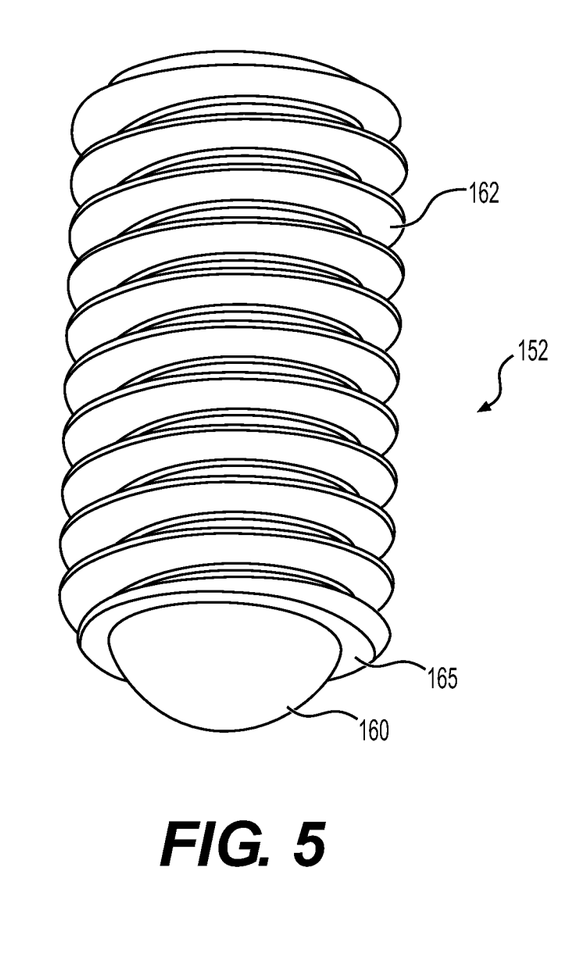
FIG. 5 is another detailed perspective view of the actuator shown in FIG. 1.

As shown in FIG. 3, the actuator 150 includes a threaded drive mechanism 152 (also referred to herein as a threaded drive gear or threaded screw gear), a drive shaft 154, and a bearing 160. The threaded drive gear 152 is at least partially disposed within the actuator recess 138 and has a threaded outer surface 162 as shown in FIGS. 3-5. A first end 164 of the threaded drive gear 152 defines a hexagonal opening and channel 166 and a conical recess 168 axially adjacent the hexagonal channel 166.

The drive shaft 154 includes a first end 156 and a second end 158 opposite and spaced apart from the first end 156. The first end 156 of the drive shaft 154 is coupled to an actuator motor 157 that rotates the drive shaft 154. The second end 158 of the drive shaft 154 includes a hexagonal portion 170 and a conically shaped portion 171 axially adjacent thereto that corresponds to the shape of the hexagonal channel 166 and conical recess 168 of the first end 164 of the threaded drive gear 152.

The bearing 160 is a spherical bearing and is coupled to the second end 165 of the threaded drive gear 152. The bearing 160 engages a conically shaped floor 140 of the actuator recess 138 of the tool head 110. Rotation of the drive shaft 154 causes rotation of the threaded drive gear 152 upon the bearing 160.

The outer surface 162 of the threaded drive gear 152 extends partially into the first feed channel 122 and the second feed channel 132 such that the outer surface 162 of the threaded drive gear 152 contacts a portion of an external perimetrical surface 145 of the first feed material 144 that is disposed within the first feed channel 122 and a portion of an external perimetrical surface 147 of the second feed material 146 that is disposed within the second feed channel 132. When the threaded drive gear 152 is driven by the drive shaft 154, the outer surface 162 of the threaded drive gear 152 engages the external perimetrical surfaces of the feed materials 144, 146 (e.g., the external circumferential surfaces of the circular feed materials 144, 146 shown in FIGS. 1 and 2) to cause the feed materials 144, 146 to be urged from the first end 116 to the second end 118 of the tool head 110.

To cause deposition of the feed material 144, 146 onto the substrate 11, the threaded drive gear 152 rotates, urging the feed material 144, 146 through the second end 118 of the tool head 110 as the tool head 110 rotates. As shown in FIG. 1, the tool 105 has deposited two full layers of feed material 144, 146 onto the substrate 11 and is in the process of depositing a third layer.

Figure 6:
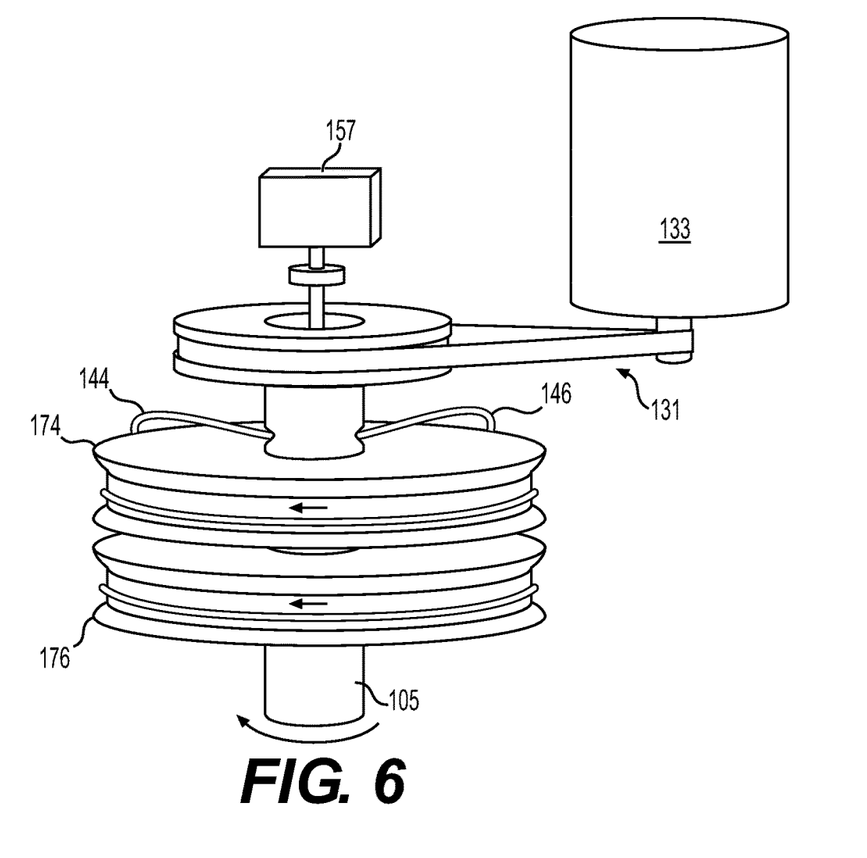
FIG. 6 is a detailed perspective view of the spools, actuator motor, and tool motor of the system in FIG. 1.

As shown in FIGS. 1 and 6, the tool head 110 is coupled to the tool 105, and the tool 105 is rotated by a tool motor 133. In the implementation shown, the tool 105 is coupled to the tool motor 133 through a drive belt 131, which transfers rotational force to the tool 105 such that the tool rotates the tool head 110 about the central axis 114. The tool motor 133 and the actuator motor 157 are driven independently of each other in the implementations shown, but in other implementations, the tool motor and the actuator motor may be driven together via a transmission arrangement. The tool motor and actuator motor may also be coupled through a linkage or gear or belt type drivetrain system.

The ratio of the speeds of rotation of the threaded drive gear 152 and the second end 118 of the tool head 110 influences the material deposition rate and the heat input to the tool head 110. For example, the greater the speed of rotation of the threaded gear drive 152 relative to the speed of rotation of the tool head 110, the more feed material is pushed out of the tool head 110. In addition, if the tool head 110 and the threaded drive gear 152 are rotating in the same direction, the speed of rotation of the threaded drive gear 152 is greater than or equal to the speed of rotation of the tool head 110. However, if the directions of rotation of the tool head 110 and the threaded drive gear 152 are opposite, the speed of rotation of the threaded drive gear 152 can be greater than or less than or equal to the speed of rotation of the tool head 110. The second end 118 of the tool head 110 is configured to be disposed adjacent a substrate onto which the feed materials 144, 146 are being friction stir deposited.

A length of the threaded portion of the threaded drive gear 152 is selected based on the compressive force desired for imparting onto the feed materials. For example, a longer threaded portion of the threaded drive gear 152 results in more compressive force onto the feed materials.

The spools 174, 176 each have a central axis that is coaxial with the central axis 114 of the tool head 105. The spools 174, 176 are coupled around the tool 105 with bearings 175, 177, respectively, disposed between the spools 174, 176 and the tool 105, as shown in FIG. 1. Rotation of the threaded gear drive 152 causes tension in the feed material 144, 146, which pulls the feed material 144, 146 through the tool 105 from the spools 174, 176 (e.g., through radial openings defined in the tool 105 or through an opening(s) defined by the end of the tool 105 opposite the tool head 110) and urges the feed material 144, 146 through the tool 105 and tool head 110 for depositing onto the substrate 11 adjacent the second end 118 of the tool head 110.

Figure 7:
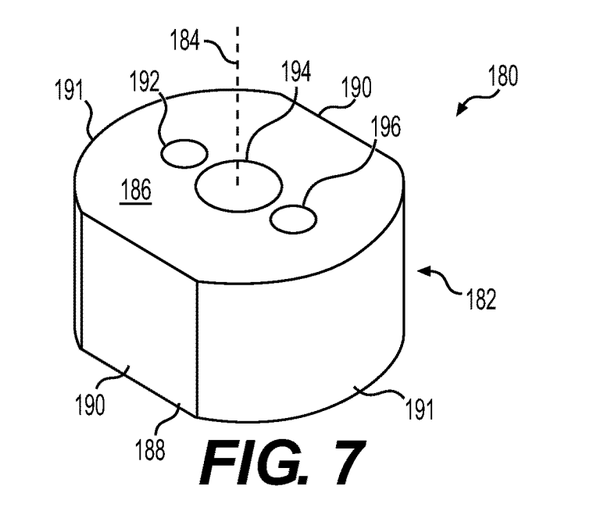
FIG. 7 is a detailed perspective view of the spacer of the system shown in FIG. 1.

The spacer 180 is configured for being disposed within the cavity 107 of the tool 105 to keep the feed materials 144, 146 and the drive shaft 154 for the threaded gear drive 152 separated within the tool 105. The spacer 180 includes a first end 186, a second end 188 opposite and spaced apart from the first end 186 along a central axis 184, and an outer surface 182 that extends between the first end 186 and the second end 188. The outer surface 182 of the spacer 180 includes two flat surfaces 190 diametrically opposed from each other and two arcuate shaped surfaces 191 diametrically opposed from each other. The flat surfaces 190 and the arcuate shaped surface 191 define a perimetrical shape that corresponds to the cross-sectional shape of the inner wall 111 of the tool 105 as viewed through a plane perpendicular to the central axis of the tool 105, which allows the spacer 180 to be inserted and held via a friction fit within the tool 105.

The spacer 180 defines a first feed material opening 192, an actuator opening 194, and a second feed material opening 196 that extend from the first end 186 to the second end 188 of the spacer 180 parallel to the central axis 184 of the spacer 180. The spacer 180 is disposed within the system 100 adjacent (e.g., axially adjacent and spaced apart from) the first end 116 of the tool head 110 such that the spacer 180 straightens the feed material 144, 146 before it reaches the tool head 110 and maintains the alignment of the actuator 150.

Figure 11:
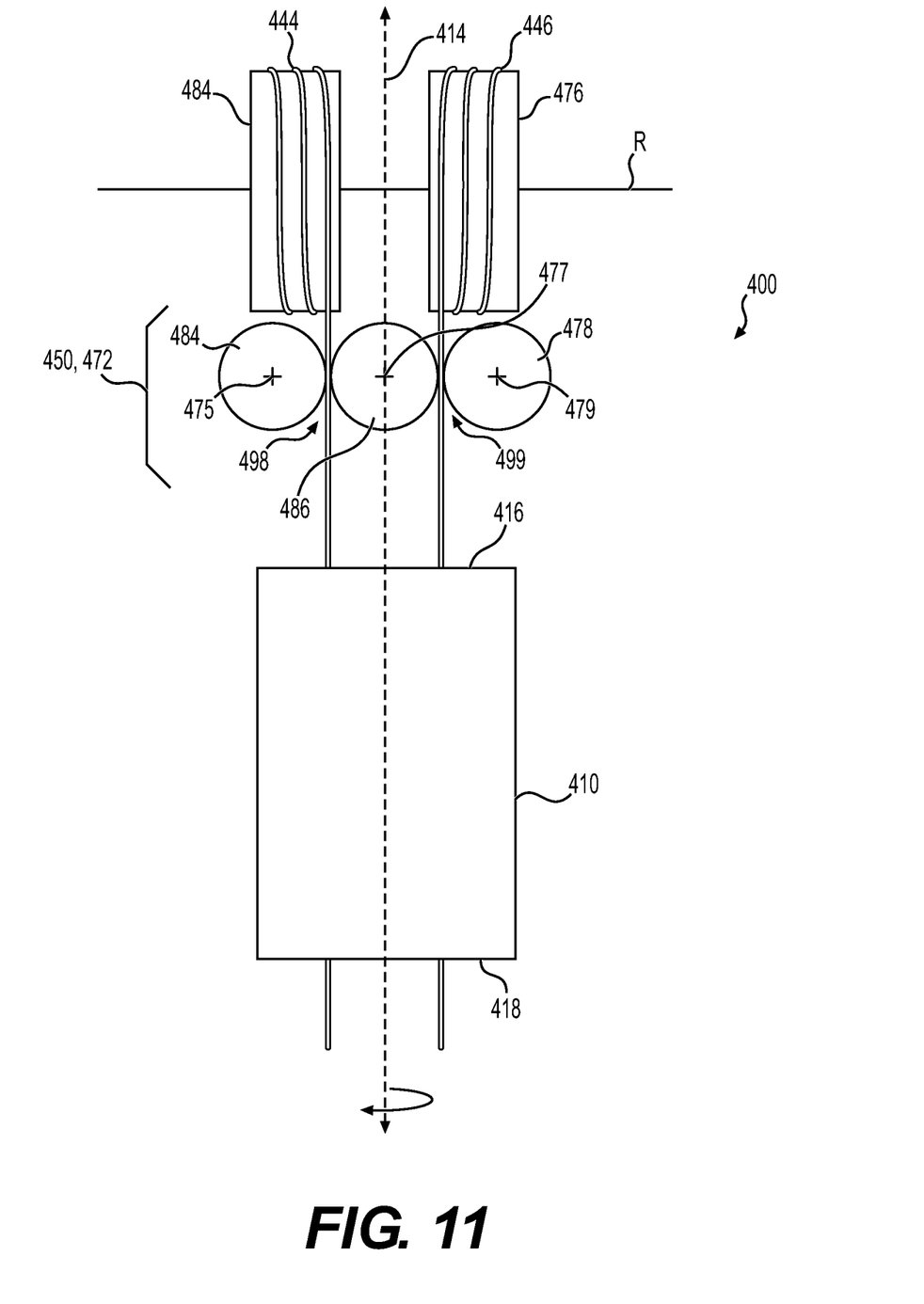
FIG. 11 is a front view of another system for friction based additive manufacturing.

Another implementation of a system for friction based additive manufacturing 400 is shown in FIG. 11. The system 400 also includes a tool head 410 and an actuator 450. The system 400 shown in FIG. 11 is similar to the system 100 described above in relation to FIG. 1, except that the spooled feed materials each have a central axis within a plane R that is transverse (e.g., perpendicular) to the central axis 414 of the tool head 410. Furthermore, instead of the threaded drive gear 152 of FIG. 1, the actuator 450 shown in FIG. 11 includes a set of pinch rollers 472. The set of pinch rollers 472 includes a pair of pinch rollers associated with each feed material to urge the respective feed material through the tool head 410. For example, the implementation shown in FIG. 11 includes a first feed material 444 and a second feed material 446. A first pair of pinch rollers are associated with the first feed material 444, and a second pair of pinch rollers are associated with the second feed material 446. The first pair of pinch rollers includes first pinch roller 474 that rotates about rotational axis 475 and second pinch roller 486 that rotates about rotational axis 477. The second pair of pinch rollers includes third pinch roller that rotates about a rotational axis that is coaxial to rotational axis 477 and fourth pinch roller 478 that rotates about rotational axis 479. The third pinch roller is not shown in FIG. 11 because it is disposed behind the second pinch roller 486 in the view shown in FIG. 11. The pinch rollers are spaced apart from the first end 416 of the tool head 410 such that the rotational axis 477 of the second pinch roller 486 and the rotational axis of the third pinch roller are perpendicular to the central axis 414 of the tool head 410. The rotational axis 475 of the first pinch roller 474 is parallel to the rotational axis 477 of the second pinch roller 486, and the rotational axis of the third pinch roller is parallel to the rotational axis 479 of the fourth pinch roller 478. In the implementation shown, the first rotational axis 475 and the fourth rotational axis 479 are also parallel to each other. The first and fourth pinch rollers 474, 478 are spaced apart from the second pinch roller 486 and the third pinch roller, respectively, such that the first and second pinch rollers 474, 486 define a first feed material gap 498, and the third and fourth pinch rollers 478 define a second feed material gap 499. The first and fourth pinch rollers 474, 478 also include a threaded outer surface (not shown) that contacts the external perimetrical surface of the first and second feed material 444, 446, respectively, when the first and second feed materials 444, 446 are disposed within the first feed material gap 498 and the second feed material gap 499, respectively. The second pinch roller 486 is idle while the first pinch roller 474 is driven (e.g., by a first actuator motor (not shown)) to rotate clockwise to urge the first feed material 444 through the first feed channel. Similarly, the third pinch roller is idle while the fourth pinch roller 478 is driven (e.g., by a second actuator motor (not shown)) to rotate counterclockwise to urge the second feed material 446 through the second feed channel. The feed materials 444, 446 are urged through the respective channels in a direction from the first end 416 to the second end 418 of the tool head 410. The feed materials 444, 446 may be urged through the respective channels one at a time or simultaneously. The driven pinch rollers may be rotated at the same speed if the feed rates for the respective feed materials are the same. Or, the driven pinch rollers may be rotated at different speeds if the feed rates for the respective feed materials are different.

In other implementations, a block or other structure may be disposed between the first roller and fourth roller instead of the second and/or third pinch rollers, and the structure provides a counter pressure to the feed material being engaged by the first roller and/or the fourth roller such that the first and fourth rollers are able to engage the circumferential surface of the respective feed material and urge the respective feed material through the tool head.

The ratio of the speeds of rotation of the rollers 472 and the second end 418 of the tool head 410 influences the material deposition rate and the heat input to the tool head 410. For example, the greater the speed of rotation of the rollers 472 relative to the speed of rotation of the tool head 410, the more feed material is pushed out of the tool head 410. The second end 418 of the tool head 410 is configured to be disposed adjacent a substrate onto which the feed materials 444, 446 are being friction stir deposited.

In another implementation, the second and third pinch rollers include a threaded outer surface and the first and fourth pinch rollers are idle with the second and third pinch rollers being driven to rotate and urge the first and second feed materials through the tool head in a direction from the first end to the second end of the tool head. In another implementation, the pinch rollers are not threaded. In other implementations, the actuator includes two or more rotating or idle pinch rollers. In some implementations, the actuator includes one, two, three, or any suitable number of pinch rollers that are threaded. Although the third pinch roller rotates about a rotational axis that is coaxial to the rotational axis 477 of the second pinch roller 486 in FIG. 11, in some implementations, the second pinch roller rotates about a rotational axis that is not coaxial to the rotational axis of the third pinch roller.

However, in other implementations (not shown), any orientation of the central axis of each spool can be used in combination with any type of actuator for urging the feed material through the tool head. For example, the rollers 472 may be used with spools oriented like spools 174, 176 shown in FIGS. 1 and 6, and the actuator 150 may be used with the spools oriented like spools 484, 476 shown in FIG. 11.

Figure 12:
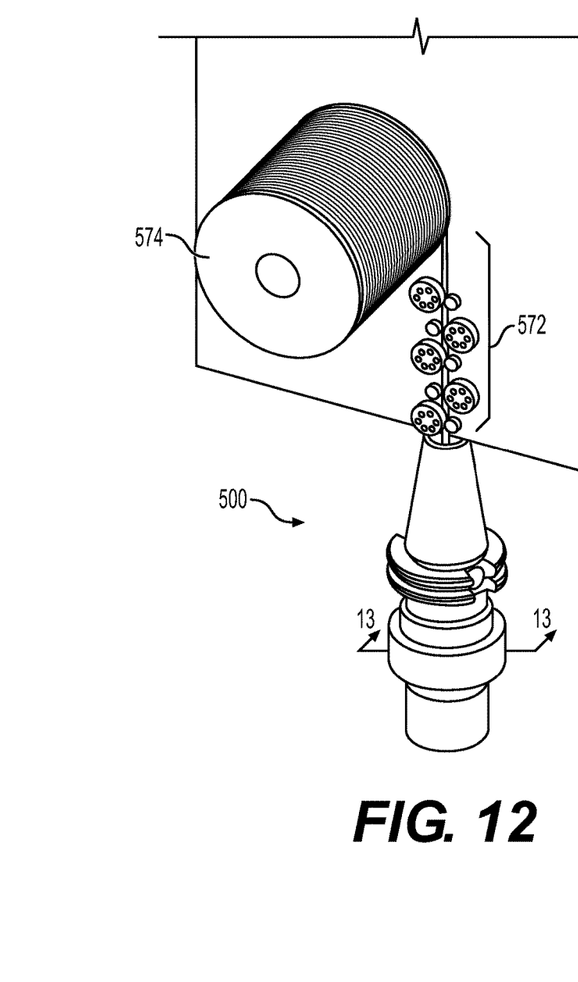
FIG. 12 is a perspective view of a system for friction based additive manufacturing according to another implementation.
Figure 13:
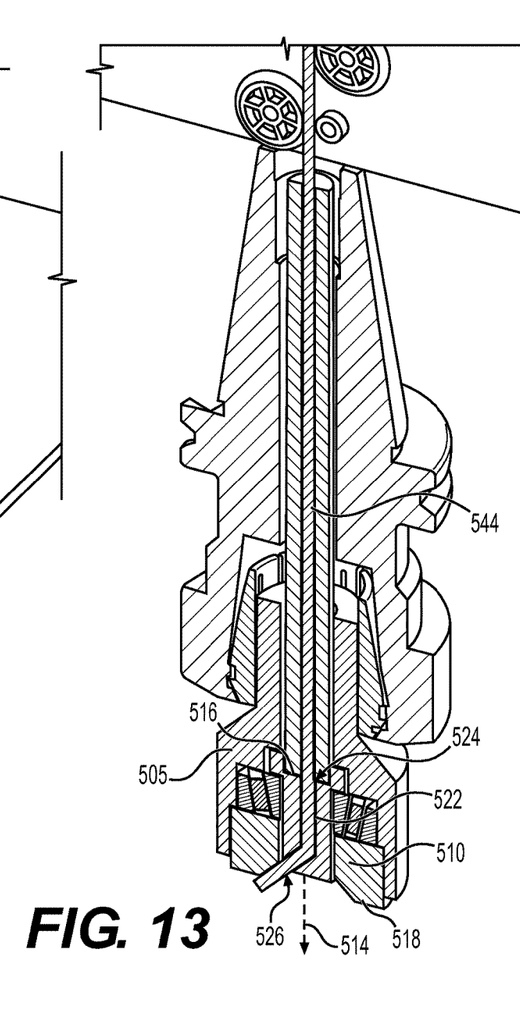
FIG. 13 is a partial, detailed, cross-sectional view of the system in FIG. 12 as taken along the 13-13 line.

FIGS. 12 and 13 illustrate another implementation of a system 500. The system 500 includes a tool head 510 that defines a channel 522 that extends between the first end 516 and the second end 518 of the tool head 510. The opening 524 to the channel 522 defined by the first end 516 is coaxial with the central axis 514 of the tool head 510, but the channel 522 bends within the tool head 510 and the opening 526 defined by the second end 518 is offset from the central axis 514 of the tool head 510. Having an offset opening in the second end 518 allows the feed material 544 being urged through the channel 522 to be offset from the central axis 514 where it is being deposited onto the substrate, which prevents the tool head 510 from rotating about a central axis of the feed material 544. The feed material 544 is spooled around spool 574 and fed into the opening 524 to the channel 522 defined by the first end 516 of the tool head 510 by rollers 572. The first end 516 of the tool head 510 is engaged within a tool 505 that rotates the tool head 510 about its central axis. The tool 505 is rotated by a tool motor (not shown), which is separate from the actuator motor that drives the rollers 572.

During an extrusion period, the feed material is being pushed out at a certain rate by the actuator as the tool is moved laterally relative to the substrate to create a layer of deposition of a certain height. During a dwell period, the feed material is frictionally engaged with the substrate and the tool head is rotated to generate and build up head in the feed material, but the tool head may not be moved laterally relative to the substrate. In some implementations, during the dwell period, the actuator (e.g., the threaded drive gear 152 or rollers 472 described in the above implementations) may be stationary or rotated at a speed that is less than the speed of rotation of the actuator during an extrusion period. In addition, the speed of rotation of the actuator may be adjusted relative to the speed of rotation of the tool head depending on whether a dwell or extrusion period is desired. For example, the speed of rotation of the actuator may be controlled to be equal to or less the speed of rotation of the tool head during a dwell period. The speed of rotation of the actuator may be controlled to be greater than the speed of rotation of the tool head during an extrusion period.

In other implementations, the actuator includes a push rod that engages an axial end of a feed rod having a discrete length (e.g., not a continuously fed wire). In implementations in which the tool head defines more than one feed channel, the actuator may include feed material engaging legs corresponding to the number of feed channels that can be axially pushed against the axial end of each feed rod. The feed material engaging legs may be pushed individually (e.g., at different forces and/or rates) or together. The feed material engaging legs are pushed against the axial ends of the respective feed material by a linear actuator, such as a rack and pinion, cam lever, impending rollers, impeding gears, electro-mechanical actuator, and hydraulic actuator. To control movement of the legs individually, a linear actuator may be configured to act on each leg individually (e.g., by using multiple linear actuators or by using a linear actuator capable of acting on the legs individually). And, in some implementations in which the legs are pushed together, a linear actuator may act on a single push leg that is coupled to the legs of the push rod.

FIG. 14 illustrates an example implementation in which the actuator 650 includes a push rod that has a push leg 652 and one or more feed material engaging legs 654, 656 that extend axially from a central body 653. The push leg 652 extends axially from the central body 653 in a first axial direction, and the feed material engaging legs 654, 656 extend axially from the central body 653 in a second axial direction that is opposite the first axial direction. The number of feed material engaging legs 654, 656 corresponds with the number of channels defined within the tool 605 and/or tool head 610 through which feed rods 644, 646 may be disposed. A distal end 657 of the push leg 652 extends out of the tool 605 and an axial force in direction F is applied to the distal end 657 of the push leg 652 to push the feed material engaging legs 654, 656 into contact with the feed rods 644, 646 in each channel defined by the tool head 610 and out of the tool head 610 onto the substrate.

In other implementations, the actuator includes a paddle wheel that pushes discrete or continuous feed material through the tool by rotating fins about an axis, wherein the fins engage the axial ends or the external perimetrical surfaces of the feed material, pushing the feed material through the tool head as the fins rotate about the axis. In yet another implementation, the actuator includes a linear actuator that linearly pushes discrete or continuous feed material through the tool. In other implementations, the actuator includes a screw feed drive, pinch rollers, paddle wheel, or linear actuators in any suitable combination for urging the feed material from the first end to the second end of the tool.

In another implementation, a method of friction based additive manufacturing is disclosed herein. The method may be used for additive friction stir deposition, for example. The method includes providing a tool head including a central axis, a first end, and a second end opposite and spaced apart from the first end along the central axis, the tool defining a feed channel that extends between openings defined by the first end and the second end, and the opening defined by the second end is offset from the central axis of the tool, and wherein the tool further comprises an actuator that is disposed adjacent the first end of the tool, disposing a portion of a feed material through the feed channel, actuating the actuator such that the actuator urges the feed material through the feed channel in a direction from the first end to the second end of the tool, and rotating the tool about the central axis and moving the tool through a plane that is parallel to a substrate onto which the feed material is being friction stir deposited by the tool.

In some implementations, the feed channel comprises a first feed channel and a second feed channel, the outlet of each feed channel being parallel to and offset from the central axis of the tool, wherein the feed material comprises a first feed material and a second feed material, and wherein disposing a portion of the feed material comprises disposing a portion of the first feed material through the first feed channel and disposing a portion of the second feed material through the second feed channel.

A number of implementations have been described. The description in the present disclosure has been presented for purposes of illustration but is not intended to be exhaustive or limited to the implementations disclosed. It will be understood that various modifications and variations will be apparent to those of ordinary skill in the art and may be made without departing from the spirit and scope of the claims. Accordingly, other implementations are within the scope of the following claims. The implementations described were chosen in order to explain the principles of the systems and methods claimed herein and their practical applications, and to enable others of ordinary skill in the art to understand the systems and methods for various implementations with various modifications as are suited to the uses contemplated.

The terminology used herein is for the purpose of describing particular implementations only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, operations, elements, and/or components, but do not preclude the presence or addition of one or more other features, operations, elements, components, and/or groups thereof.

What is claimed is:

1. An additive friction stir deposition system for friction based additive manufacturing, the system comprising:
   a tool head comprising a central axis, a first end, and a second end opposite and spaced apart from the first end along the central axis, the tool head defining a feed channel that extends between openings defined by the first end and the second end, wherein the opening defined by the second end is offset from the central axis and wherein the feed channel has a circular cross sectional shape as taken in a plane that extends perpendicular to the central axis, the tool head configured for rotating about the central axis; and
   an actuator, the actuator being configured to urge a feed material through the feed channel in a direction from the first end to the second end of the tool, wherein the actuator is disposed adjacent the first end of the tool head, and the second end of the tool head is configured to contact a layer of deposited feed material and/or a substrate onto which the feed material is being friction stir deposited.

2. The system of claim 1, wherein the feed channel comprises two or more feed channels.

3. The system of claim 2, wherein the two or more feed channels comprise first and second feed channels that are diametrically opposed from each other.

4. The system of claim 2, wherein the two or more feed channels comprises first, second, and third feed channels.

5. The system of claim 4, wherein the openings for the first, second, and third feed channels defined by the second end are equally spaced from each other about the central axis of the tool head.

6. The system of claim 1, wherein the actuator is configured for engaging an external perimetrical surface of the feed material to cause the feed material to be urged from the first end to the second end of the tool head.

7. The system of claim 6, wherein the actuator comprises a pair of pinch rollers associated with each feed channel.

8. A method of friction based additive manufacturing, the method comprising:
   providing a tool head comprising a central axis, a first end, and a second end opposite and spaced apart from the first end along the central axis, the tool head defining a feed channel that extends between openings defined by the first end and the second end, the feed channel having a circular cross sectional shape as taken in a plane that extends perpendicular to the central axis, the opening defined by the second end being offset from the central axis, and wherein the tool head further comprises an actuator that is disposed adjacent the first end of the tool head;
   disposing a portion of a feed material through the feed channel;
   actuating the actuator such that the actuator urges the feed material through the feed channel in a direction from the first end to the second end of the tool head;
   contacting, via the second end of the tool head, a layer of deposited feed material and/or a substrate onto which the feed material is being friction stir deposited by the tool head; and
   rotating the tool head about the central axis and moving the tool head through a plane that is parallel to the substrate.

9. The method of claim 8, wherein the feed channel comprises a first feed channel and a second feed channel, wherein the feed material comprises a first feed material and a second feed material, and wherein disposing a portion of the feed material comprises disposing a portion of the first feed material through the first feed channel and disposing a portion of the second feed material through the second feed channel.

10. The method of claim 9, wherein the first feed material and the second feed material are different.

11. The method of claim 9, wherein the first feed material and the second feed material are the same.

12. The method of claim 8, wherein the actuator is configured for engaging an external perimetrical circumferential surface of the feed material to cause the feed material to be urged in an axial direction.

13. The method of claim 12, wherein the actuator comprises a pair of pinch rollers associated with each feed channel, and wherein actuating the actuator comprises rotating the pinch rollers.

14. An additive friction stir deposition system for friction based additive manufacturing, the system comprising:
   a tool head comprising a central axis, a first end, and a second end opposite and spaced apart from the first end along the central axis, the tool head defining a feed channel that extends between openings defined by the first end and the second end, wherein the opening defined by the second end is offset from the central axis and wherein the feed channel has a circular cross sectional shape as taken in a plane that extends perpendicular to the central axis, the tool head configured for rotating about the central axis; and
   an actuator, the actuator being configured to urge a feed material through the feed channel in a direction from the first end to the second end of the tool head, wherein the actuator is disposed adjacent the first end of the tool head, and the second end of the tool head is configured for being disposed adjacent a substrate onto which the feed material is being friction stir deposited,
   wherein the actuator further comprises a threaded drive gear having a threaded outer surface extending partially into the feed channel, the threaded outer surface configured to engage with and urge the feed material from the first end to the second end of the tool head.

15. The system of claim 1, wherein the feed channel is a linear feed channel.

* * * * *